Sept. 18, 1934.  C. J. LEHN  1,973,769
REGULATOR
Filed Feb. 26, 1932   2 Sheets-Sheet 1
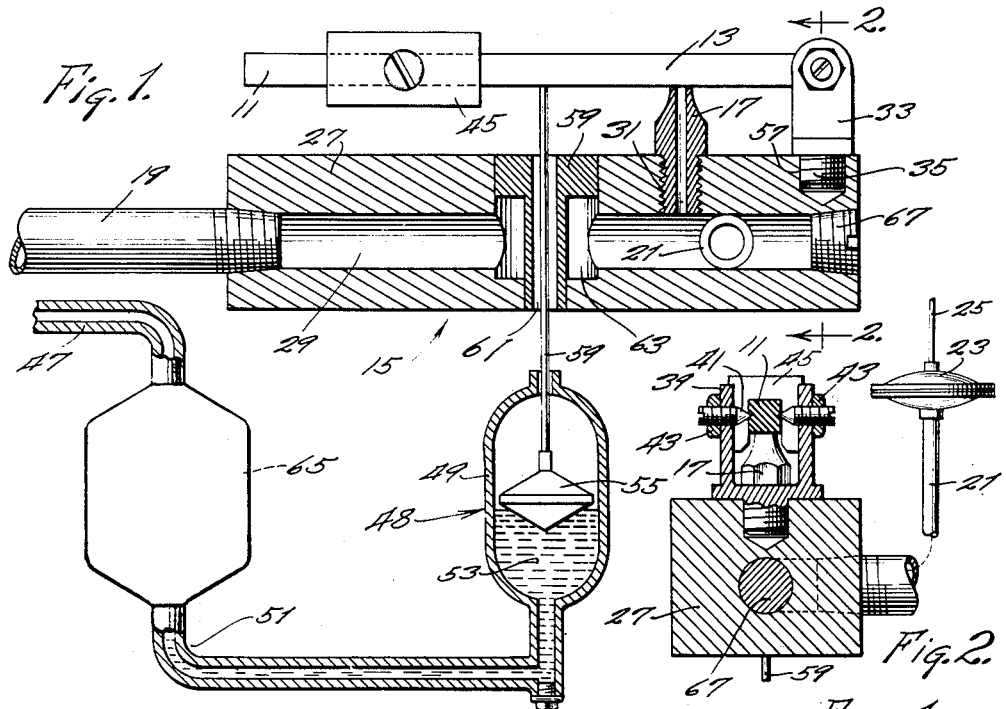
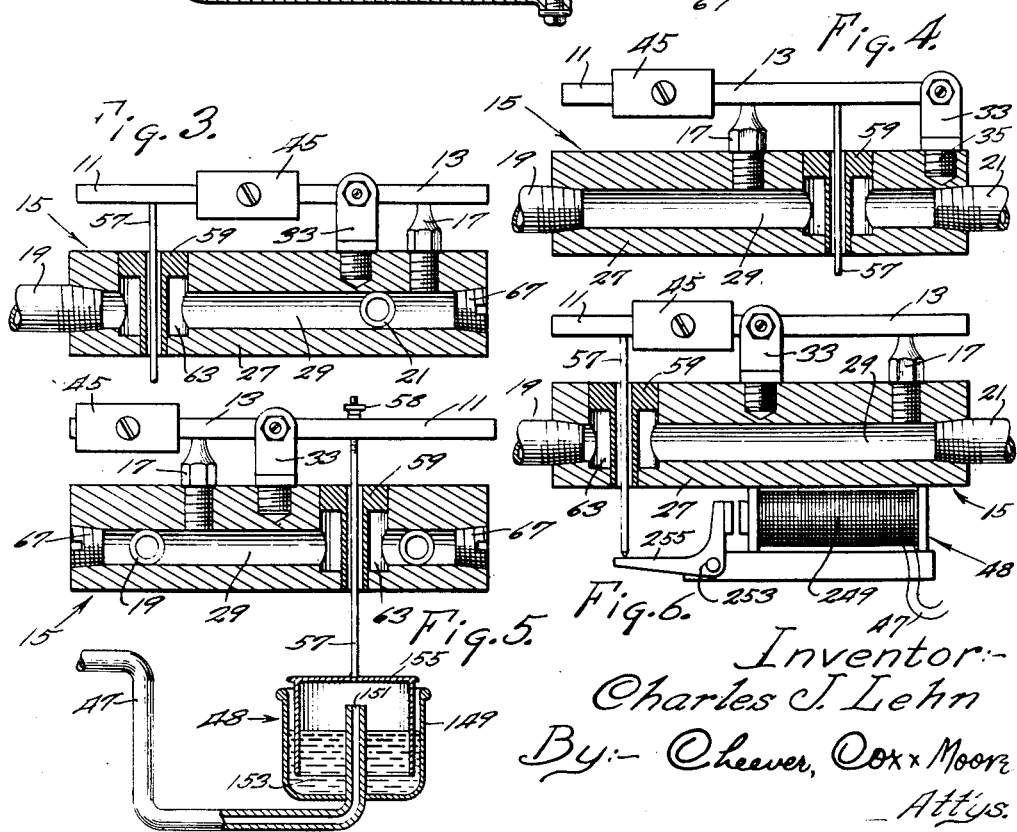
Inventor:-
Charles J. Lehn
By:- Cheever, Cox & Moore
Attys.

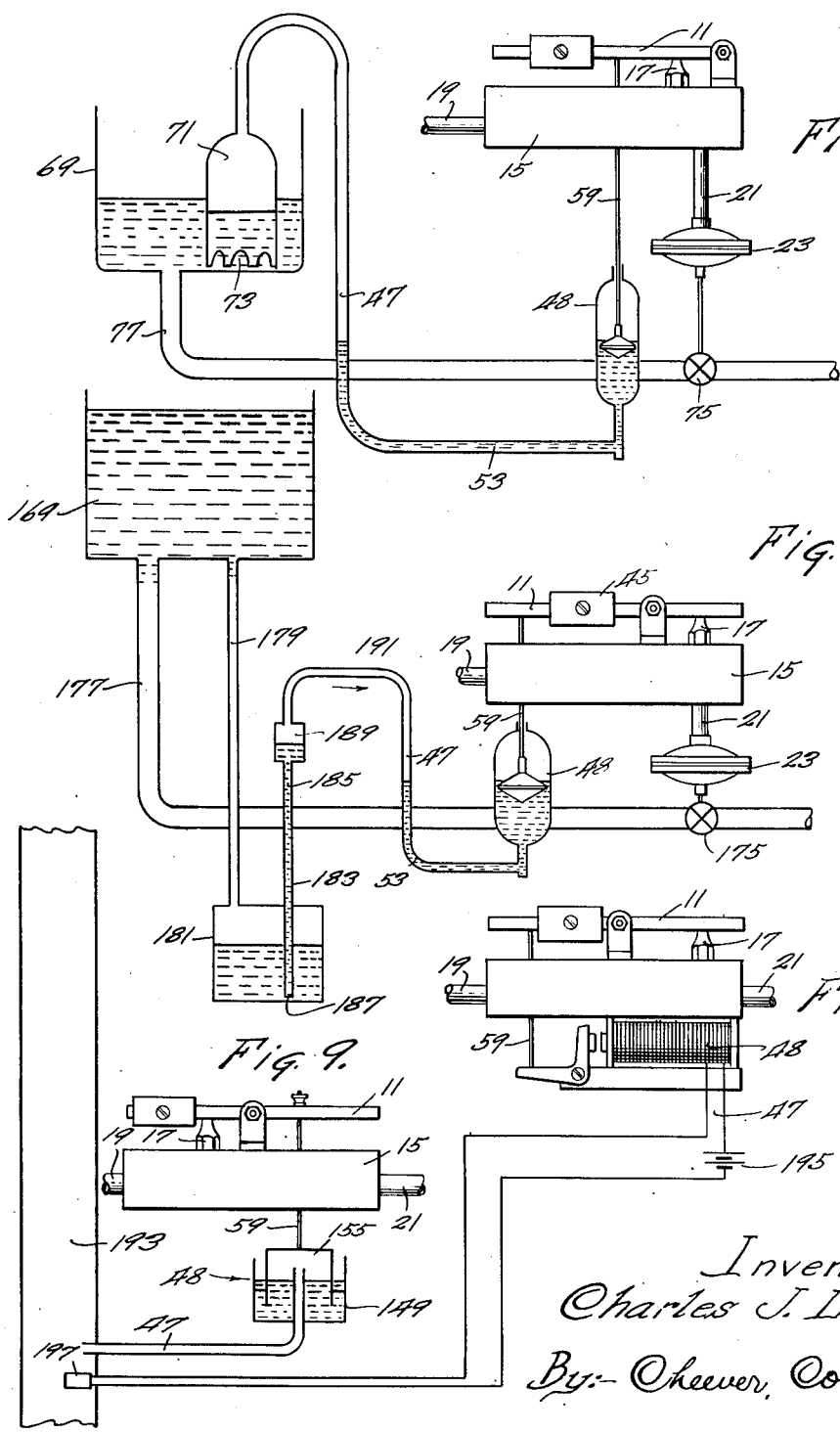

Patented Sept. 18, 1934

1,973,769

UNITED STATES PATENT OFFICE 1,973,769

REGULATOR

Charles J. Lehn, Oak Park, Ill.

Application February 26, 1932, Serial No. 595,340

11 Claims. (Cl. 137—78)

My invention relates in general to controls and has more particular reference to a relay device for accurately and sensitively regulating the operation of apparatus in response to fluctuations in controlling operating conditions at a remote point from the apparatus being controlled.

The device of my present invention is especially well adapted for controlling furnaces and kindred apparatus, in which it is desired to utilize compressed air or other pneumatic means as a control medium, although it will be obvious, as the description proceeds, that certain novel features of the device may be used for regulating apparatus in which the control is effected by other than pneumatic means.

In general my invention consists in providing a control circuit including a conductor for a fluid operating medium and providing a switch or valve in the conductor with means to actuate the valve to control the effect of the fluid medium at a remote point in the circuit at which the control is effective and one of the important objects of the invention is to provide such a device in which the switch or valve operates in an extremely sensitive manner to provide for the precision control of the controlled apparatus.

Another important object is to provide a control means for use in pneumatic control circuits.

Still another important object is to provide a device of the class described wherein slight variations in controlling conditions may be utilized to rapidly and instantaneously effect a corresponding change in the controlled device.

Among the other objects and advantages is to provide a neat, rugged and compact relay for controlling pneumatic circuits.

Numerous other objects and advantages of the invention will be apparent as the same is more fully understood from the following description, which, taken in connection with the accompanying drawings, discloses a preferred embodiment of the invention.

Referring to the drawings:

Figure 1 illustrates a portion of an operating circuit provided with a relay embodying my present invention, the relay and its associated operating mechanism being shown in longitudinal section;

Figure 2 is a vertical section taken substantially along the line 2—2 in Figure 1;

Figures 3, 4, 5 and 6 contain views similar to that of Figure 1 for the purpose of illustrating modified structures; and Figures 7, 8, 9, and 10 illustrate several type applications of my device as a control relay.

To illustrate my invention, I have shown in the drawings a control relay illustrated generally at 15. The form of relay, which I have chosen, is particularly adapted for use in pneumatic control circuits, but features of the relay are adapted for incorporation in other than pneumatic controls and I do not wish to restrict the invention to the operating medium used in the system.

In its essence, the invention consists of a pivoted bar 11 having a portion 13 adapted to regulably control a switch or bleeder valve 17, the valve being arranged in a suitable conductor for the operating medium in order to control the flow of the medium through the circuit to the controlled device. The circuit extends from a remote source of the fluid power medium (not shown), through a suitable conductor 19 to the control relay 15, thence through a conductor 21 to a remote device 23, the operation of which is to be controlled by the relay 15. In certain instances, a return conductor from the device to the power source may be provided, although, where compressed air is used as the operating medium, a return conductor is not usually necessary. I prefer to employ compressed air as the fluid operating medium and any suitable or convenient means of generating or compressing the fluid medium and storing it for use may be employed. The conductors 19 and 21 are formed as pipes or conductors capable of withstanding the pressures employed. The device 23 also may be any suitably operating device, such as a diaphragm motor or other means for converting the energy of the medium in the conductor 21 into mechanical movement as of the operating rod 25, which movement may be employed in operating an apparatus to be controlled.

In Figures 1 and 2, I have illustrated a device, which is particularly well adapted for controlling the dampers of a furnace (not shown) in response to the relatively minute pressure variations in the stack. To this end, the rod 25 may be connected for opening and closing the dampers of the furnaces and the devices are arranged so that the rod 25 is moved to one of its shifted damper operating positions when the bleeder valve 17 is closed. If the valve 17 is opened, however, the operating medium will be prevented from actuating the device 23, that is to say, the compressed air in the control circuit will be permitted to escape through the valve 17 so that the pressure in the conductor 21 and at the device 23 will be reduced and the connecting rod 25 shifted to a retracted position, thus changing the position of the damper being controlled.

The device 15 consists preferably of a block of elongated metal 27 through which a channel 29 is formed. The channel 29 is connected with the conduits 19 and 21 by threading the conduits into the block; and the valve or switch 17 comprises a nozzle part which is threaded into an opening 31 formed in the block 27 in such a way that the nozzle at its inner end opens into the channel 29 and its outer end communicates with the atmosphere.

The block 27 preferably carries the rod 11 in a bracket 33 having a threaded portion 35, which is screwed into a tapped opening 37 in the block 27 adjacent the valve opening 31. The bracket 33, upwardly of the block 27, comprises a pair of upstanding ears 39 between which the tiltable rod 11 is pivotally mounted. I prefer to mount the rod 11 between a pair of hardened pins 41, which are adjustably threaded through the ears 39 with their points engaging and taking into the bar 11 on opposite sides thereof. The pins 41 may be locked in adjusted position by means of the nuts 43 and provide an extremely delicate pivoted support for the rod. The rod extends from its pivoted support longitudinally above the block 27 and overlies its portion 13 upon the upper open end of the nozzle 17. The bar 11 also carries a slidable weight 45 thereon upon the side of the nozzle opposite from the pivot supports so that the bar in Figures 1, 4 and 5 is normally pressed down upon the nozzle and seals the same against the escape of the fluid power medium. In Figures 3 and 6, the weight is used to hold the bar 11 normally in valve open position. The medium in the operating circuit is normally maintained at a predetermined pressure sufficient to operate the device 23. If, however, the pressure should increase unduly, the arrangement illustrated will provide a safety valve permitting the fluid to escape through the nozzle and thus protect the operating device 23 from excessive pressures.

In order to actuate the control relay, an operating system comprising a conductor 47 extends to the remote point from which the control is to be effected, as for instance the stack of a furnace, the slight fluctuations of the pressure in which determines the furnace damper setting. The conductor 47 terminates in a device 48, forming means to operate the lever 11 to open or close the switch 17 in response to fluctuations in the controlling conditions at the remote point at the far end of the conductor 47.

In the form of the invention shown in Figure 1, the device 48 comprises a chamber 49 and an adjacent curved portion 51, which with the chamber 49 forms a manometer preferably filled with a liquid 53, such as mercury.

The chamber 49 also contains a float 55 having an upwardly extending rod 57, which extends preferably, though not necessarily, through a sleeve 59, which is mounted in the block 27 to provide a channel 61 for the purpose of guiding the rod 57 therethrough. The sleeve 59 is formed in such a way that there is no connection between the channel 29 and the channel 61 and the channel 29 may be enlarged, as at 63 where the sleeve 59 passes therethrough, in order to provide ample space for the passage of the operating medium through the channel 29 and around the sleeve 59. The upper end of the rod 57 engages the rod 11 in such a way that any rise or fall in the level of the liquid 53 in the chamber 49 will shift the rod 57 longitudinally and in turn impart a movement in the bar 11 about its pivot points 41.

Any change in pressure or other controlling conditions at the remote control point, to which the conduit 47 extends, will actuate the fluid 53 in the manometer and effect the position of the float 55. As soon as the float 55 is elevated from the position shown in Figure 1, the lever 11 will be lifted to uncover the nozzle 17 and permit the fluid medium in the control circuit to escape at this point, consequently changing the operating pressure at the control device 23 and permitting same to operate the dampers or other controllable element with which it is or may be associated. The weight 45 provides for a certain amount of adjustment. By moving it toward the left, in Figure 1, the opening of the valve 17 may be slightly retarded and by shifting it to the right, the opening of the valve 17 may be speeded.

The sensitivity of operation of the relay also may be controlled by the relative size of the compartment 49 and of the other arm of the manometer. If the bore of the said other arm is increased at 65, unit change of pressure in the conduit 47 will cause a much larger deplacement of the fluid in the manometer than when the bore of said arm is of smaller diameter and will result in a relatively larger displacement of the float. Conversely the size of the chamber may be reduced to reduce the sensitivity of the device.

The conduits 19 and 21 may, of course, be attached to the block 17 at opposite ends of the channel 29 as shown in Figures 4 and 6, or the ends of the channel 29 may be plugged with threaded stoppers 67 as shown in Figure 5 of the drawings, the conduits 19 and 21, in such case, being attached to the back of the block 11. This construction is particularly well adapted for use where the relay is to be mounted on a panel and the conduits 19 and 21 brought out through the panel to the regulator. It is also possible to have one conduit enter the channel 29 from the side while the other enters from an end. This, as illustrated in Figures 1 and 3, is accomplished by applying a stopper 67 at the other end of the channel.

In Figures 3, 5 and 6, I have shown modified constructions wherein the bar 11 is pivoted intermediate the point at which it is engaged by the actuating shaft 57 and the point at which it engages the nozzle 17. By this arrangement, the nozzle 17 is opened to release the pressure in the conduit 29 when the shaft 57 drops whereas in the arrangements shown in Figures 1 and 4, the nozzle is open and the pressure released when the shaft 57 rises.

In Figure 4 of the drawings, the rod 57 is located between the nozzle 17 and the point about which the lever 11 is pivoted. This arrangement requires considerably more lifting force to be exerted by the actuating member 57 than in the form shown in Figure 1 and illustrates a way of controlling the sensitivity of the device by re-arranging the relative position of the rod 57.

In Figure 5 of the drawings, the parts are arranged so that the weight 45 normally urges the lever 11 toward nozzle closing position. This may also be accomplished in the arrangements in Figures 3 and 6 by suitably positioning the weight. In such a case, with the fulcrum 33 between the nozzle and the rod 57, it is necessary to attach the rod to the lever. To this end the rod 57 penetrates a perforation in the lever and is provided with a nut 58 whereby the downward movement of the rod 57 positively rotates the lever in order to uncover the nozzle.

In Figure 5 also, the means 48, for shifting the bar, comprises a novel form of float in which the end of the tube 47 terminates as an upwardly opening orifice 151 within a cup-shaped member 149, which is partially filled with a suitable liquid 153, such, for instance, as water, the level of which is somewhat below the upwardly open end of the pipe. An inverted cup-shaped member 155 extends within the cup 149 with its edges resting in the liquid 153 so as to form an expansible air-tight chamber within the inverted cup 155. The cup 155 is also attached to the rod 57 so that any slight change of pressure applied to the remote end of the conduit 47 will alter the pressure within the cup 155 and move it upwardly or downwardly as the case may be and thereby impart actuating movement in the rod 57.

In Figure 6 of the drawings, I have also shown the possibility of utilizing as the actuating means 48, an electrically controlled device comprising a solenoid 249. In this arrangement, the conductor 47 comprises an electric circuit for connecting the solenoid with suitable means (not shown) located at the remote point for actuating the solenoid in response to variations in the controlling operating conditions. The solenoid has an armature 253 formed as a bell crank, one arm of which is shifted by the solenoid when the same is energized through the circuit 47. The other arm 255 of the bell crank engages the operating rod 57, which, in turn, shifts the lever 11 in order to control the valve 17.

In Figures 7, 8, 9, and 10, I have illustrated several typical applications of my control relay. In Figure 7, a relay having an arrangement substantially as shown in Figure 1, is utilized to control the liquid level of the tank 69 by immersing the remote end of the conductor or conduit 47 in the liquid of the tank 69. The end of the pipe 47 is preferably formed as a downwardly opening bell shaped element 71, the lower edge rests upon the bottom of the tank and is provided with cutouts 73 to permit liquid from the tank to enter the bell. As the liquid level rises in the tank 69, the liquid level within the bell will also rise and compress the air or other fluid medium in the pipe 47 above the mercury 53. This compression will cause the level of the mercury to rise in the device 48 and will raise the operating rod 59 of the relay 15 and uncover the nozzle 17 with the result that the device 23 is actuated to shut a valve 75 in a fluid supply pipe 77 which feeds the tank 69. If the liquid level in the tank 69 falls below a predetermined minimum, the pressure in the conduit 47 will be released, the rod 59 permitted to drop, closing the valve 17 and operating the device 23 to open the valve 75 in order to replenish the tank.

In Figure 8 I have also shown an arrangement for employing a relay of the form shown in Figure 3 to regulate the liquid level in a tank 169. In this device the tank is provided with a feed pipe 177 controlled by a valve 175. The tank also has a conduit 179 leading to the lower chamber 181 of a mercury manometer which consists of a tube 183 providing a mercury column 185, the tube 183 dipping into a pool of mercury contained in the chamber 181 and having its lower notched end 187 resting on the bottom of the chamber 181. The upper end of the tube 183 is enlarged at 189 to provide what is known as a "mercury pot". The mercury pot is connected to the conduit 47. As the liquid level in the tank 169 increases to a critical level, the fluid pressure in the mercury chamber 181 increases and forces the mercury level in the pot 189 to rise thus compressing the fluid medium 191, usually air or water, in the conduit 47 and causes this fluid medium to travel in the direction illustrated by the arrow. This will depress the end of the mercury column 53 in the conduit 47 and cause a corresponding rise in the mercury level in the device 48 thus lifting the valve 59 and tilting the lever 11 against the resistance of the weight 45 to a position closing the nozzle 17. Closing the nozzle 17 in turn causes the device 23 to close a valve 175 which is positioned in the fluid main 177 and thus cut off the supply of liquid to the tank 169. When the liquid level in the tank 169 falls below a critical level, the reversing action takes place and the valve 175 is opened. In this way, the liquid level in the tank 169 may be maintained constant between extremely small limits.

In Figure 9 of the drawings, I have shown the manner of connecting the device illustrated in Figure 5 to a stack 193 in order to utilize the variations of pressure in the stack to control the operation of a device (not shown), which may be utilized to perform any desired remote control operation. The conduit 47 opens at its remote end directly in the stack so that any reduction of pressure in the stack will reduce the pressure within the inverted cup 155 and cause the same to be drawn downwardly into the cup-shaped member 159 and thus draw the shaft 59 downwardly and open the nozzle 17 through the rotation of the lever 11 in a clockwise direction viewing Figure 9. This operation, in accordance with the principles of the relay may be utilized to operate a remote control device connected to the conductor 21 as heretofore described.

Figure 10 of the drawings illustrates the connection of a relay having the form shown in detail in Figure 6 of the drawings to operate a remote control device in accordance with variations of temperature in the stack 193. The conductors 47 form an electrical circuit including the battery 195 and the thermostat 197, which comprises a switch positioned in the stack 193 and adapted to open or close the circuit when a predetermined temperature prevails in the stack. Closing the switch permits the circuit to energize the device 48 and thereby operate the shaft 59 to tilt the lever 11 to a position closing the nozzle 17, which in accordance with the previously disclosed operation of the relay will result in effecting a controlling movement in a device (not shown) associated with the conductor 21 at its remote end. Opening the switch 197 will result in opening the nozzle 17 and effect a reversing control movement of the device associated with the conduit 21.

One of the important features of the invention is the simplicity of the device consisting as it does simply of a delicately balanced lever 11, controlling the valve or switch, which in turn controls the circuit which in turn actuates the controlled device 23 and the means 48 operable in response to the controlling conditions to actuate the lever. The parts are of simple construction and can be made readily with automatic or semi-automatic machine tools. The device is simple, rugged and extremely sensitive, and is such that it can be made up easily in any form having a desired sensitivity of operation to accommodate for any operating condition under which the device may be used. The device thus has a wide range of utility necessarily and is not restricted for use in operating furnace dampers in response to variations of pressure in the stack but made be employed wherever a delicate and precise control device is desired.

It is thought that the invention and numerous of its attendant advantages will be understood from the foregoing description and it is obvious that numerous changes may be made in the form, construction and arrangement of the several parts without departing from the spirit or scope of my invention or sacrificing any of its attendant advantages; the form herein described being a preferred embodiment for the purpose of illustrating my invention.

Having thus described my invention, what I claim as new and desire to secure by Letters Patent is as follows:

1. In a control for use in combination with a device to be operated in response to fluctuations in controlling conditions at a remote point, the combination with a source of fluid operating medium, of regulator means comprising a block having a channel for receiving and supplying the operating medium to the device to be operated, control means on said block including a bleeder valve communicating with said channel for regulating the passage of the operating medium to the device, means including a lever tiltable on said block in position to open and close the bleeder valve, and means operable to tilt said lever in response to the variations in controlling conditions at the remote point.

2. In a control for use in combination with a device to be operated in response to fluctuations in controlling conditions at a remote point, the combination with a source of fluid operating medium, of regulator means comprising a block having a channel for receiving and supplying the medium to a device to be controlled, control means on said block for regulating the flow of the operating medium, said control means comprising a bleeder valve communicating with said channel, a member pivoted on said block and adapted to open and close said bleeder valve, and a longitudinally movable member shiftable on said block in response to the variations in operating-controlling conditions at the remote point, said longitudinally movable member being operatively associated with said pivot member to shift the same in order to open and close said valve.

3. In a control for use in combination with a device to be operated in response to fluctuations in controlling conditions at a remote point, the combination with a source of fluid operating medium, of regulator means comprising a block having a channel for receiving and supplying the medium to a device to be controlled, control means on said block for regulating the flow of the operating medium, said control means comprising a bleeder valve communicating with said channel, a member pivoted on said block and adapted to open and close said bleeder valve, and a longitudinally movable member shiftable on said block in response to the variations in operating-controlling conditions at the remote point, said longitudinally movable member being operatively associated with said pivot member to shift the same in order to open and close said valve, and means to shift said longitudinally movable member comprising a fluid chamber, a float in said chamber supported by the fluid therein and connected to the longitudinally movable member and a conductor extending from the fluid chamber to the remote control point.

4. In a control for use in combination with a device to be operated in response to fluctuations in controlling conditions at a remote point, the combination with a source of fluid operating medium, of regulator means comprising a block having a channel for receiving and supplying the medium to a device to be controlled, control means on said block for regulating the flow of the operating medium, said control means comprising a bleeder valve communicating with said channel, a member pivoted on said block and adapted to open and close said bleeder valve, and a longitudinally movable member shiftable on said block in response to the variations in operating-controlling conditions at the remote point, said longitudinally movable member being operatively associated with said pivot member to shift the same in order to open and close said valve, and means to shift said longitudinally movable member comprising a shiftable armature operatively associated with the longitudinally shiftable member, a solenoid associated with the armature and adapted when energized to shift the armature and a conductor for energizing the solenoid, said conductor extending to the remote control point.

5. A regulator for controlling a fluid pressure operable device in accordance with conditions prevailing at a remote location comprising a block having a channel therein adapted to receive fluid under pressure from a suitable source and to transmit same to the fluid pressure operable device, means on said block forming a fluid blow-off cock for said channel, a lever tiltable on the block in position to overlie the blow-off cock and close the same, means to bias the lever for tilting movement in one direction with respect to the block, and means operable in response to varying conditions at the remote control location to tilt the lever in a reverse direction in order to control the blow-off cock and in turn control the delivery of fluid under pressure to the operable device.

6. A regulator for controlling a fluid pressure operable device in accordance with conditions prevailing at a remote location, comprising a block having a channel therein adapted to receive fluid under pressure from a suitable source and to transmit same to the fluid pressure operable device, means on said block forming a fluid blow-off cock for said channel, a lever, and means to tiltably support the lever on the block in position to overlie the blow-off cock, said lever having means to close said cock, said lever being biased for tilting movement in one direction to said block and being tiltable in the opposite direction in response to varying conditions at the remote location in order to open and close said blow-off cock and thus control the delivery of fluid under pressure to the operable device.

7. A regulator comprising a block having a channel therein adapted to receive fluid under pressure from a suitable source and transmit the same to a fluid pressure operable device, means on said block forming a fluid blow-off cock for said channel, said cock comprising a nipple extending outwardly of said block, and means to close said nipple to prevent the escape of fluid therethrough comprising a lever tiltable on the block in position to overlie the nipple outlet, means biasing the lever to tilt in one direction with respect to said block, and means to tilt the lever in the opposite direction comprising a longitudinally shiftable member, said block having means formed therein to support and guide said member in position to engage the lever.

8. A regulator comprising a block having a channel therein adapted to receive fluid under pressure from a suitable source and transmit the same to a fluid pressure operable device, means on said block forming a fluid blow-off cock for said channel, and means to close said cock to prevent the escape of fluid therethrough comprising a tiltable lever on the block, means controlled by the tilting movement of the lever to open and close the cock, and means to tilt the lever comprising a longitudinally shiftable member mounted on and guided by said block in position to engage the lever.

9. A regulator comprising a block having a channel therein adapted to receive fluid under pressure from a suitable source and transmit the same to a fluid pressure operable device, means on said block forming a fluid blow-off cock for said channel, and means to close said cock to prevent the escape of fluid therethrough comprising a tiltable lever on the block, means controlled by the tilting movement of the lever to open and close the cock, and means to tilt the lever comprising a longitudinally shiftable member, and means mounted on and carried by the block and providing a guide channel extending through said block for receiving said longitudinally shiftable member therein and supporting the same in position to engage the lever.

10. A regulator comprising a block having a channel therein adapted to receive fluid under pressure from a suitable source and transmit the same to a fluid pressure operable device, means on said block forming a fluid blow-off cock for said channel, means to close said cock to prevent the escape of fluid therethrough comprising a tiltable lever on the block, means controlled by the tilting movement of the lever to open and close the cock, and means to tilt the lever comprising a longitudinally shiftable member, and means comprising a plug fitted into a seat formed in the block, said plug extending in and through said fluid channel without obstructing the free flow of fluid and affording a guide channel having an axis intersecting said fluid channel and adapted to receive and support said longitudinally shiftable member in position to operatively engage the lever.

11. A device as set forth in claim 1, wherein the block is formed with an additional guide channel which intersects but does not communicate with the main fluid channel and wherein the lever tilting means comprises a member shiftably mounted in said guide channel.

CHARLES J. LEHN.